US008447836B2

(12) United States Patent
Mahalal et al.

(10) Patent No.: US 8,447,836 B2
(45) Date of Patent: May 21, 2013

(54) PROTOCOL CONVERSION "BEARER INDEPENDENT PROTOCOL (BIP)"—TCP/IP FOR COMMUNICATION BETWEEN SIM AND TERMINAL

(76) Inventors: Ilan Mahalal, Meudon (FR); Nicolas Chaumartin, Meudon (FR); Jorge Abellan Sevilla, Meudon (FR)

( * ) Notice: Subject to any disclaimer, the term of this patent is extended or adjusted under 35 U.S.C. 154(b) by 703 days.

(21) Appl. No.: 11/629,546

(22) PCT Filed: Jun. 10, 2005

(86) PCT No.: PCT/IB2005/001621
§ 371 (c)(1),
(2), (4) Date: May 17, 2007

(87) PCT Pub. No.: WO2005/125154
PCT Pub. Date: Dec. 29, 2005

(65) Prior Publication Data
US 2007/0239857 A1 Oct. 11, 2007

(30) Foreign Application Priority Data

Jun. 15, 2004 (EP) .................................... 04291503
Aug. 11, 2004 (EP) .................................... 04292033

(51) Int. Cl.
*G06F 15/16* (2006.01)

(52) U.S. Cl.
USPC .......... 709/219; 455/73; 455/556.1; 455/557; 455/558; 370/352

(58) Field of Classification Search
USPC ............... 709/219, 246; 455/556.1, 557, 558, 455/73; 370/352
See application file for complete search history.

(56) References Cited

U.S. PATENT DOCUMENTS

| 2003/0067909 A1* | 4/2003 | Jerbi et al. ..................... 370/352 |
| 2004/0131083 A1* | 7/2004 | Arques et al. .................. 370/469 |
| 2004/0176134 A1* | 9/2004 | Goldthwaite et al. ......... 455/558 |
| 2005/0138004 A1* | 6/2005 | Teplitsky et al. ................. 707/3 |
| 2005/0259673 A1* | 11/2005 | Lu et al. ......................... 370/419 |
| 2008/0010456 A1* | 1/2008 | Seif .............................. 713/169 |
| 2008/0133760 A1* | 6/2008 | Berkvens et al. ............. 709/228 |

OTHER PUBLICATIONS

Guthey et al., "The WebSIM—Clever Smartcards Listen to Port 80" dated: Dec. 15, 1999, draft version, pp. 1-16.*
International Search Report for PCT/IB2005/001621 mailed Sep. 29, 2005 (2 pages).

(Continued)

*Primary Examiner* — Harunur Rashid
(74) *Attorney, Agent, or Firm* — Osha Liang LLP (57) ABSTRACT

The services of an HTTP or HTTPS server, being implemented by or running on a first electronic device that is a portable device, are offered to an application running on a second electronic device by exchanging HTTP messages between the first electronic device and the second electronic device over a local communication channel according to the Bearer Independent Protocol. The application running on the second electronic device may use the TCP/IP protocol for exchanging HTTP messages with the server. A gateway is employed on the second electronic device, which manages the local communication channel and performs protocol conversion, Bearer Independent Protocol—TCP/IP, for messages received from the application running on the second electronic device, and protocol conversion, TCP/IP—Bearer Independent Protocol, for messages being sent to the server, where the second electronic device is a terminal hosting the portable device.

15 Claims, 3 Drawing Sheets

OTHER PUBLICATIONS

"Toward SSL Integration in SIM Smartcards" Author(s): Mohamad Badra et al. As published in: Wireless Communications and Networking Conference, 2004 WCNC 2004 IEEE Atlanta, GA, USA Mar. 21-25, 2004 Piscataway, NJ USA IEEE, vol. 2 Mar. 21, 2004 pp. 889-894, XP010708248.

"Webcard: A Java Card Web Server" Author(s): Jim Rees et al. As published in: Smart Card Research and Advanced Applications. IFIP Working Conference on Smart Card Research and Advanced Applications, Sep. 20, 2000 pp. 197-207 XP001013569.

* cited by examiner

PROTOCOL CONVERSION "BEARER INDEPENDENT PROTOCOL (BIP)"—TCP/IP FOR COMMUNICATION BETWEEN SIM AND TERMINAL

BACKGROUND OF THE INVENTION

1. Field of the Invention

The present invention generally relates to the exchange of data between a first electronic device and a second electronic device, and more specifically to the exchange of HTTP (Hypertext Transfer Protocol) messages between a web server being implemented by or running on the first electronic device and a web browser running on the second electronic device.

The first electronic device according to the invention a portable device, and the second electronic device according to the invention is external to the portable device. In the main application of the invention, the first electronic or portable device will be an integrated circuit card or smart card, in particular the ones compatible with ISO 7816-4, comprising platforms such as (U)SIM ((U) Subscriber Identification Module), UICC, R-UIM (Removable—User Identification Module) and WIM (Wireless Identification Module), and the second electronic or external device will be a smart card terminal in the form of a mobile telephone. We will use the example of a smart card and a terminal throughout this description. The invention nevertheless can be applied to other cases where e.g. the portable device is a Multi Media Memory card or the external device is a PDA (Personal Digital Assistant) or a PC (Personal Computer).

2. Background Art

Web servers such as HTTP or HTTPS servers can be embedded in portable devices like smart cards. Resources residing on the smart card can then be accessed via HTTP by an application running on the terminal to which the smart card is connected. Furthermore, since HTTP is designed to transmit hypertext pages, a web browser can be used on the terminal, e.g. as a user interface for smart card applications.

The application layer Internet protocol HTTP is designed to be used over TCP/IP (Transmission Control Protocol/Internet Protocol) and standard browsers use TCP/IP to transmit HTTP messages. However, for data transmission between a smart card and a terminal, usually other protocols than TCP are used on transport layer level. In particular, current smart card solutions hosting a web server use proprietary protocols for transmission of HTTP messages.

SUMMARY OF THE INVENTION

It is therefore an object of the invention to provide the mechanisms for exchanging HTTP messages between a web server embedded in a portable device, like a smart card, and an application running on an external device, like a web browser running on a smart card terminal, using existing transport layers on the smart card.

It is a further object of the invention to allow the application running on the external device to use TCP/IP for the exchange of HTTP messages, just as if there was a TCP/IP connection between this application and the web server embedded in the portable device.

This object is achieved by the methods and the devices as defined in the independent claims. Further preferred embodiments are defined in the dependent claims.

According to a preferred embodiment of the invention, the object is achieved by a method of offering the services of an HTTP or HTTPS server, the server being implemented by or running on a first electronic device, to a second electronic device, where the first electronic device exchanges RTTP messages with the second electronic device over a communication channel between the first and the second electronic device according to the Bearer Independent Protocol.

This has the advantage that standard mechanisms and commands as defined by standardization bodies like 3GPP (3rd Generation Partnership Project) and ETSI (European Telecommunications Standards Institute) can be used to exchange HTTP messages between the first and the second electronic device.

According to a further preferred embodiment of the invention, the HTTP messages communicated by the first electronic device to the second electronic device over the communication channel are determined to be further communicated within the second electronic device over TCP/IP to an application running on the second electronic device, and the HTTP messages received by the first electronic device from the second electronic device have been communicated within the second electronic device over TCP/IP.

This has the advantage that the application for exchanging the HTTP messages with the server can use TCP/IP, which is the standard protocol for exchanging HTTP messages. According to a further preferred embodiment of the invention, the application running on the second electronic device is a web browser and the HTTP or HTTPS server serves HTML, xHTML, cHTML or WML pages to this web browser.

By doing so, hypertext pages can be used, e.g., to form the user interface of an application running on the first electronic device.

According to a further preferred embodiment of the invention, the DECLARE SERVICE command is used to notify the second electronic device that the first electronic device offers the services of the HTTP or HTTPS server.

This allows the first electronic device to download into the database of the second electronic device the information that the first electronic device provides the services of a web server.

According to a further preferred embodiment of the invention, the user can be authenticated with a standard HTTP WW-Authenticate delivering PIN-Type and/or PIN-Value attributes.

This allows user identification by solely using HTTP messages understood by a web browser, rendering the use of other commands like APDU (Application Protocol Data Unit) commands unnecessary.

In a preferred embodiment of the invention the first electronic device is a smart card.

In another preferred embodiment of the invention the first electronic device is a Multi Media Memory card.

One preferred embodiment of the inventions is a computer program element comprising computer program code means to make a first electronic device execute the previously described method.

Another preferred embodiment of the invention is an electronic device implementing or running an HTTP or HTTPS server and executing the previously described method.

A further embodiment of the invention is a method of enabling an application running on a second electronic device to use the TCP/IP protocol for exchanging HTTP messages with an HTTP or HTTPS server being implemented by or running on a first electronic device, a communication channel according to the Bearer Independent Protocol being used for exchanging the HTTP messages between the second electronic device and the first electronic device, on the second electronic device the communication channel being managed by a gateway which performs protocol conversion Bearer Independent Protocol—TCP/IP for messages being received from the HTTP or HTTPS server, and protocol conversion TCP/IP—Bearer Independent Protocol for messages being sent to HTTP or HTTPS server.

The application running the second electronic device can then establish a TCP/IP connection to the gateway just as if the connection was established to the HTTP server directly, which makes the use of the Bearer Independent Protocol transparent to the application.

According to a further preferred embodiment of the invention, an internal IP address and an internal domain name are allocated for the gateway and the internal domain name is mapped to the internal IP address, and the internal domain name is used in Uniform Resource Identifiers to indicate that the Uniform Resource Identifier identifies a resource on the first electronic device.

When the application running on the second electronic device wants to access the resource identified by the Uniform Resource Locator, its HTTP request via TCP/IP will be directed to the gateway, where it can be passed on to the smart card server.

According to a further preferred embodiment of the invention, the first electronic device is a smart card and the Uniform Resource Identifier comprises information to access standardized smart card applications such as (U)SIM and WIM applications.

By doing so, the application running on the second electronic device can serve for displaying a hypertext user interface of the smart card application.

According to a further preferred embodiment of the invention, a command is sent to the first electronic device in order to open a communication channel when the application running on the second electronic device opens a TCP/IP socket to the gateway.

The communication channel between the gateway and the HTTP server can then be used as a continuation of a TCP/IP connection between the application running on the second electronic device and the gateway.

According to a further preferred embodiment of the invention, the TCP/IP socket is mapped to the opened channel.

Each communication channel can then be used as a dedicated channel for one socket connection, simplifying the forwarding of HTTP messages in the gateway.

According to a further preferred embodiment of the invention, the second electronic device is a web browser.

A web browser is a standard application for displaying hypertext pages and accessing a web server using HTTP.

According to a further preferred embodiment of the invention the second electronic device is a mobile telephone.

According to a further preferred embodiment of the invention the second electronic device is a PDA.

According to a further preferred embodiment of the invention the second electronic device is a PC.

One preferred embodiment of the inventions is a Computer program element comprising computer program code means to make a device execute the previously described method.

Another preferred embodiment of the invention is a device running an application and executing the previously described method.

BRIEF DESCRIPTION OF THE DRAWINGS

The foregoing and other objects, aspects and advantages of the invention will be better understood from the following detailed description of the preferred embodiments of the invention made with reference to the drawings, in which.

DETAILED DESCRIPTION OF A PREFERRED EMBODIMENT OF THE INVENTION

According to the invention, proactive UICC commands according to the Bearer Independent Protocol as defined in ETSI TS 102 223 (e.g. section 4.11 and section 6), in the following called "BIP commands", are used for communicating HTTP messages between the first electronic device and the external device. The Bearer Independent Protocol is the set of commands (OPEN CHANNEL, CLOSE CHANNEL, SEND DATA, RECEIVE DATA, and GET CHANNEL STATUS) and events (Data available, Channel status) which allows a smart card to establish a communication channel with a terminal, and through the terminal to a remote server or a remote device in a network. Between the smart card and the terminal existing lower protocol layers are used to exchange data on the communication channel. Between the terminal and the remote server or remote device different protocols can be used, to make the use of the Bearer Independent Protocol transparent to the remote server or remote device.

Figure 1:
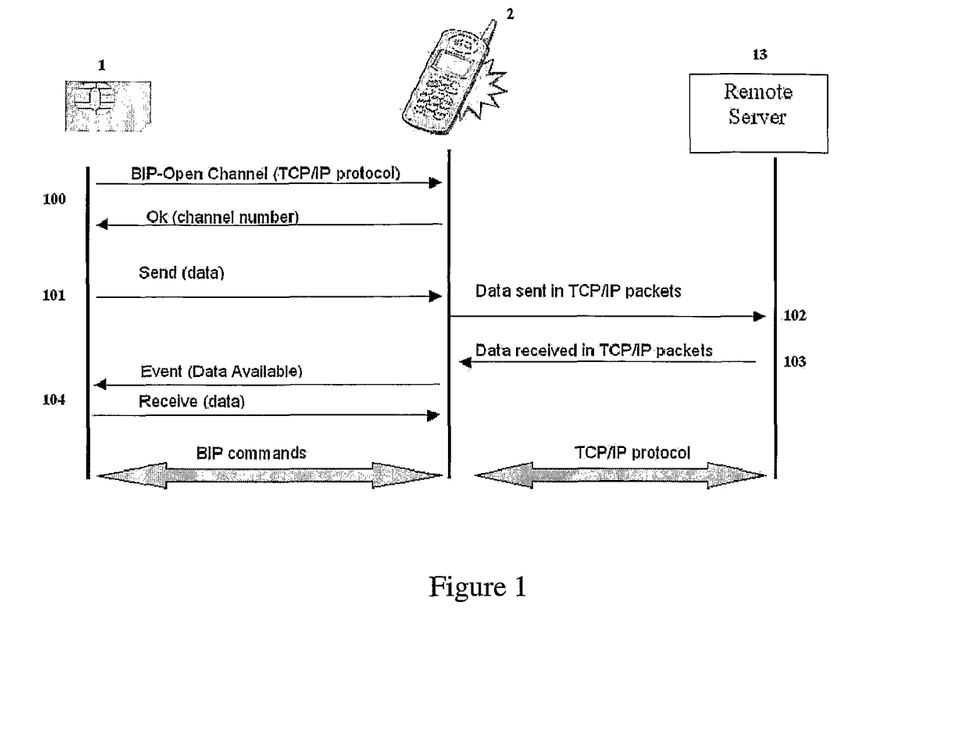
FIG. 1 is a schematic diagram showing how data is transmitted between a smart card and a remote server using the Bearer Independent Protocol and TCP/IP.

FIG. 1 shows an example of a communication between a smart card 1 and remote server 13 through a terminal 2, using TCP/IP between the terminal and the remote server. In step 100 the communication channel is established between the smart card 1 and the terminal 2. In step 101 the terminal 2 receives data from the card 1 via the SEND command, which the terminal in step 102 inserts into TCP packets and sends them to the remote server 13 over a previously established TCP/IP connection. In step 103 the terminal 2 receives data from the remote server 13 over the TCP/IP connection, strips the data from the TCP packets and sends it to the card 1 in step 104, where the card 1 is notified by the terminal 2 using a Data available event, whereupon the card 1 pulls the data from the terminal 2 sending a RECEIVE command.

Figure 2:
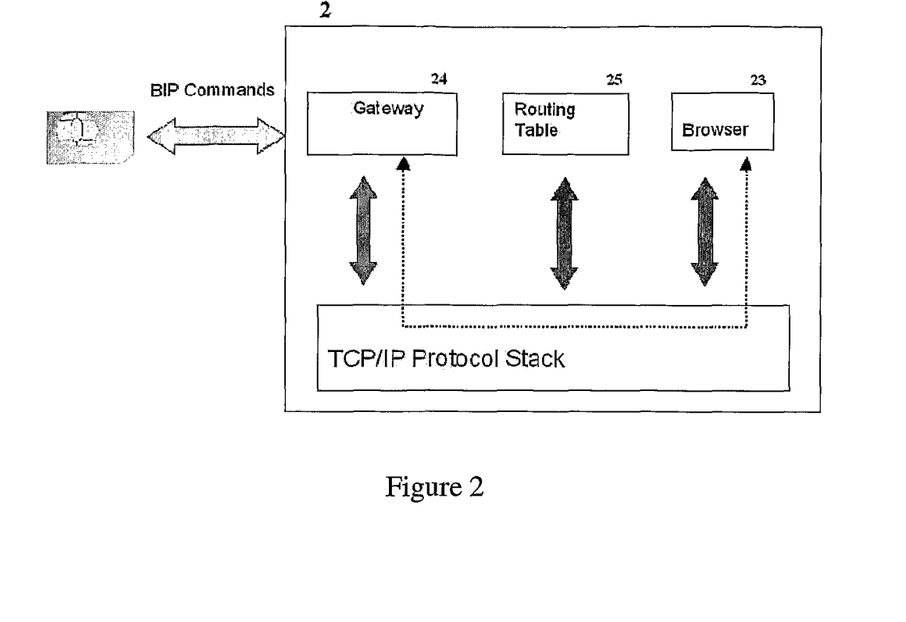
FIG. 2 is a schematic diagram showing a preferred embodiment of the invention, in particular the components used for data transmission on the external device.

However, while the Bearer Independent Protocol is actually designed to facilitate communication between a smart card and a remote server or remote device outside the terminal, BIP commands can also be used for communication between the smart card and an application running locally on the terminal. FIG. 2 shows how HTTP messages according to the invention are communicated between a server running on a first electronic device 1, like a web server running on a smart card, and an application 23 running on an external device 2, like a web browser on a smart card terminal. This browser can be, e.g., a browser for displaying HTML (Hypertext Modelling Language), xHTML (extensible HTML), cHTML (compact HTML) or WML (Wireless Markup Language) pages.

The messages are not transmitted directly via a TCP/IP connection between the server and the browser 23, but via a gateway 24 residing on the terminal 2. HTTP messages between the server and the gateway 24 are communicated over communication channels using BIP commands. HTTP messages between the gateway 24 and the browser 23 are communicated over TCP/IP sockets.

In other words, instead of establishing a TCP/IP connection to the server, the browser 23 establishes this connection to the gateway 24. The gateway 24 forwards the HTTP messages received via the TCP/IP connection from the browser 23 to the server via the communication channel, and in the other direction it forwards the HTTP messages received from the server via the communication channel to the browser 23 via the TCP/IP connection.

Figure 3:
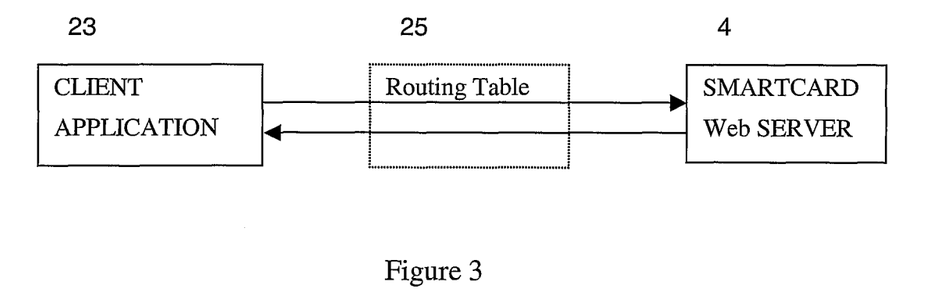
FIG. 3 is a schematic diagram illustrating how data is exchanged between a smart card web server and a terminal web client using a routing table.

In HTTP requests, Uniforms Resource Identifiers (URI) are used to identify a requested resource, see specification of the Hypertext Transfer Protocol version 1.1 in RFC 2616, section 5. To access the smart card, URIs like http://localsmartcard will be used. The domain name denoting the smart card, in the example "localsmartcard", is mapped to an internal IP address which is assigned to the gateway. This mapping will be fixed e.g. in a static routing and DNS table 25 residing on the smart card. When the web browser 23 wants to access a smart card resource identified by a URI, it is directed to the gateway 24 by the routing and DNS table 25. This configuration is illustrated in FIG. 3, showing that a web browser 23 communicates with a smart card web server 4 by consulting a routing table 25.

It is the task of the gateway to manage the communication channels and to perform protocol conversion between the Bearer Independent Protocol and TCP/IP, as will now be explained.

Figure 4:
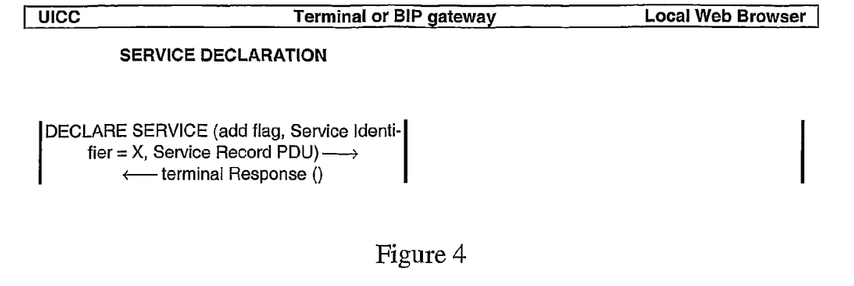
FIG. 4 is a diagram showing the command sequence for the service declaration between smart card and terminal.

In an initial phase, a smart card 1 running a web server 4 according to a preferred embodiment of the invention may indicate this service to the terminal using the "DECLARE SERVICE" command, e.g. with the command sequence proposed in ETSI TS 102 223 (annex M) and as shown in FIG. 4. The service declaration typically will be carried out at startup.

Figure 5:
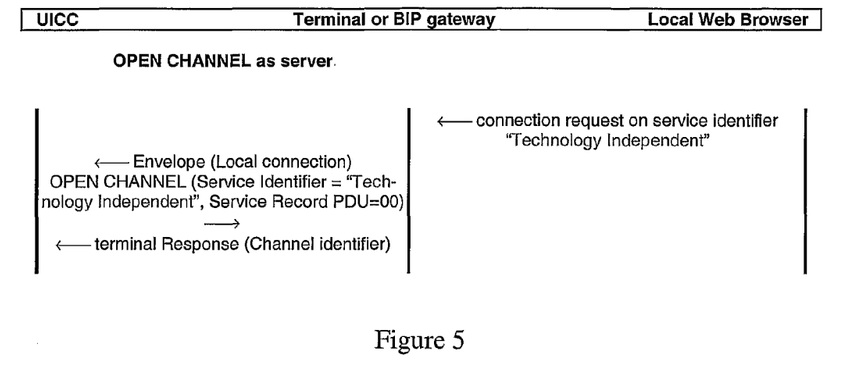
FIG. 5 is a diagram showing the command sequence for the opening of a communication channel between the smart card and the terminal.

The first time the web browser connects to the gateway in order to access the HTTP server, the gateway triggers the opening of a communication channel, e.g. by using the command sequence proposed in ETSI TS 102 223, annex M, and as shown in FIG. 5. The gateway sends an ENVELOPE (Local connection), to make the smart card 1 send an OPEN CHANNEL command to the terminal 2. The ENVELOPE command is an APDU command used to transmit data to an application residing on the smart card 1, see e.g. ETSI TS 102 221, section 7.4.2.2; the OPEN CHANNEL command is a BIP command as defined in ETSI TS 102 223, section 6.4.27.

In a preferred embodiment of the invention, the gateway opens a new communication channel each time the web browser opens a TCP/IP socket to the gateway. A socket represents an endpoint of communication on which a connection can be established. The gateway then preferably maps the opened socket to the opened channel, so that for each socket which the web browser intends to open to the web server 4 a dedicated communication channel is created between the web server 4 and the gateway 25.

Once the communication channel is established, data can be exchanged between the web browser 23 and the web server 4. The gateway performs protocol conversion between the Bearer Independent Protocol and TCP/IP by sending the HTTP messages received via the TCP/IP socket from the web browser 23 to the web server 4 via the communication channel, and sending the HTTP messages received from the web server 4 via the communication channel to the web browser 23 via the TCP/IP socket.

Figure 6:
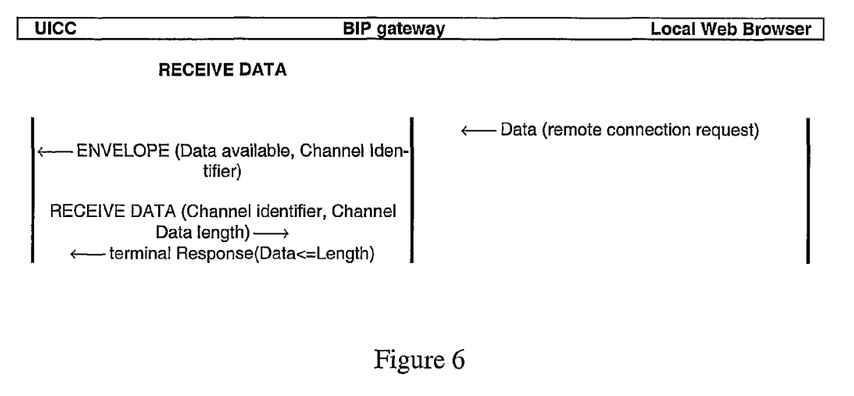
FIG. 6 is a diagram showing the command sequence for sending data from the terminal web browser to the smart card.

An example of the command sequence for sending data from the web browser 23 to the web server 4 is given in FIG. 6, in accordance with annex M of ETSI TS 102 223. The gateway, after having received data from the web browser 23, sends an ENVELOPE command to the smart card to inform it that data has arrived and to make it send a RECEIVE DATA command. The RECEIVE DATA command is a BIP command as defined in ETSI TS 102 223, section 6.4.29. This command indicates to the gateway the maximum data length the smart card is willing to receive. The gateway then transmits the data using a TERMINAL RESPONSE command. TERMINAL RESPONSE is an APDU command as defined in ETSI TS 102 221, section 10.1. Note that a channel identifier identifying the communication channel on which the communication takes place is transmitted as a parameter in both the ENVELOPE and RECEIVE DATA commands.

For transmission of HTTP messages in the other direction, i.e. from the web server 4 to the web browser 23, a similar mechanism is employed. Instead of a RECEIVE DATA, a SEND DATA command will be sent from the smart card 1 to the gateway 24. The SEND DATA command is a BIP command as defined in ETSI TS 102 223, section 6.4.30. It will be used for transmitting the HTTP message from the web server 4 to the gateway 24, so that the latter can forward it via TCP/IP to the web browser 23.

In the following, the syntax of a smart card URI, whose use in HTTP requests was already mentioned above, will be explained in greater detail. The general URI syntax is defined in RFC 2396 as follows:

<scheme>:<scheme-specific-part>

In the context of the present invention, the scheme "http" is used.

In a great number of URIs, the general syntax of <scheme-specific-part> is

//<authority><path>?<query> where each of the components <authority>, <path> and ?<query> may be absent in a particular URI.

<authority> denotes a top hierarchical element for a naming authority. In the context of the present invention, the intended usage of a smart card URI generally is for local smart card content accessed by a terminal web browser 23. Therefore, the authority component could be a domain name like "localsmartcard".

The <path> component identifies the resource within the scope of the scheme and authority. A complete syntax of the path component for the local smart card can be depicted as follows:

| | |
|---|---|
| <path> = | ["/"sc_resource]* |
| <sc_resource> = | <df> \| <ef> |
| <df> = | 2*[<BYTE] \| "USIM" \| "WIM" \| <aid> |
| <ef> = | 2*[<BYTE>] |
| <aid> = | "AID="16*[BYTE] |
| <BYTE> = | 2*[HEX] |
| <HEX> = | "A" \| "B" \| "C" \| "D" \| "E" \| "F"\| "a" \| "b" \| "c" \| "d" \| "e" \| "f" \| <DIGIT> |
| <DIGIT> = | "1" \| "2" \| "3" \| "4" \| "5" \| "6" \| "7" \| "8" \| "9" \| "0" |

"df" stands for a smart card Dedicated File, which corresponds to a directory in the smart card file system, "ef" stands for a smart card Elememtary File, which corresponds to a smart card data file.

"USIM" and "WIM" refer to a USIM (Universal Subscriber Identity Module, see 3GPP TS 31.102) and WIM (Wireless Identity Module) Application Dedicated File (ADF) when a smart card contains such an application.

Examples for URIs with authority and path components as defined above are:

http://localsmartcardlUSIM/12A1
http://localsmartcardl3F00

The <query> component is a string of information to be interpreted by the resource. A proposed syntax is:

| | |
|---|---|
| <query> = | <http_query> \| <state> |
| <http_query> = | n*[BYTE] |

The <state> component is a string that could be used as an indication to the smart card framework at which entry point to begin the execution of an application which creates dynamic content as response to an HTTP request.

Within a query component, the characters ";", "/", "?", ":", "@", "&", "=", "+", ",", and "$" should be reserved.

Examples of URIs with query components according to the above definition are:

http://localsmartsard/3F00/2F24?record=02
http://localsmartcard/12121215199764382564579867542734/?state=entry1

In the following, some security considerations for access through a web server to resources residing on the smart card will be outlined.

If the smart card resource requires an access condition which has not been fulfilled, the smart card server 4 can provide means to enable this security conditions as they are defined for local terminal-application APDU protocols. E.g., it may issue a request in order to ask the user a PIN (Personal Identity Number).

The authorization is performed between the client application 23 and the smart card server 4, using the standard HTTP authorization exchange, which is briefly depicted in the following:

The smart card server 4 will respond to an HTTP request with an HTTP response message containing a Status-Line with a status code "401" (Unauthorized) and a WWW-Authenticate field consisting of at least one challenge that indicates the authentication scheme(s) and parameters applicable to the Request-URI.

In a preferred embodiment of the invention, the smart card server 4 challenges with a PIN request using a WWW-Authenticate field as follows:

| |
|---|
| WWW-Authenticate : Digest realm= <PINName> |

Note:
<PINName> string can have different values depending on the type of PIN being asked (e.g. "PIN1", "CHV1")

The response will be sent to the client application 23. The client application 23 should then perform the corresponding dialog with the user (e.g. request PIN or password) and send back the request including an Authorization request header containing the Authorization credentials.

Note: for PIN usage, the PIN value is passed in the response data field. The username, if present, may be ignored by the smart card server 23.

In the following, an example of communicating HTTP messages between a terminal web browser 23 and a smart card web server 4 will be given.

The browser 23 displays the following HTML page:

```
<HTML><BODY>
    <A HREF="http://localsmartcard/7F40/5F30"> Test the
    smartcard-URI </A>
</BODY></HTML>
```

The user clicks on the link.
The access verification in this case is PIN verification. The VERIFY PIN command must be sent with the following data:

| Byte(s) | Description | Length |
|---|---|---|
| 1-8 | PIN value | 8 |

The browser sends the following HTTP GET request to the smart card:
GET http://localsmartcard/7F40/5F30 HTTP/1.1
The smart card gateway sends the request in BIP commands. The command data is:

| Byte(s) | Description | Length |
|---|---|---|
| 1-Lc | GET http://localsmartcard/7F40/5F30 HTTP/1.1 | Lc |

The smart card server 4 may then retrieve the corresponding resource (e.g. content of a file) and send it back with the following HTTP Response sent in BIP commands:

| Byte(s) | Description | Length |
|---|---|---|
| 1-Le | HTTP/1.1 200 OK<br>Content-type: text/plain<br>Content-length: 3406<br>This is the content of the file | Le |

When receiving the response, the gateway 24 will encapsulate it in a TCP/IP packet and send it as an HTTP response packet to the browser.

In the following, a definition of a minimal HTTP profile needed for accessing a web server 4 on a smart card 1 is given. The profile is defined as a subset of HTTP 1.1. The following restrictions apply:

The URI field can be in absolute form. (e.g. http://localsmartcard/12A1) respecting the rules for smart card URIs as defined in this document.

The HTTP version which should be implemented on the smart card web server 4 is HTTP/1.1. Thus, according to HTTP 1.1 specification in RFC 2616, the value of the HTTP-Version field should be "HTTP/1.1".

The following table lists the HTTP methods that should be supported by the smart card web server 4 along with recommendations which one of these should be optional or mandatory:

| Method | Supported |
|---|---|
| OPTIONS | Optional |
| GET | Mandatory |
| HEAD | Mandatory |
| POST | Mandatory |

-continued

| Method | Supported |
|---|---|
| PUT | Mandatory |
| DELETE | Optional |
| TRACE | Optional |
| CONNECT | Optional |

When receiving an incoming request that is not supported, the smart card server 4 shall respond with an HTTP response message with Status-Code=405 (Method not allowed).

The following table lists the GENERAL headers to be supported by the smart card web server along with recommendations which ones of these should be optional or mandatory.

| Field | Supported |
|---|---|
| Connection | Mandatory |
| Date | Optional |
| Pragma | Optional |
| Trailer | Optional |
| Transfer-Encoding | Optional |
| Upgrade | Optional |
| Via | Optional |
| Warning | Optional |

Specific actions on reception:

The smart card web server 4 will ignore the non-supported fields.

The following listed REQUEST header fields for each of the HTTP request messages should be supported by the smart card web server 4.

| Field | Supported | Additional comments |
|---|---|---|
| Accept | Optional | |
| Accept-Charset | Optional | |
| Accept-Encoding | Optional | |
| Accept-Language | Optional | |
| Authorization | Mandatory | |
| Expect | Optional | |
| From | Optional | |
| Host | Optional | Host field SHALL be empty. |
| If-Match | Optional | |
| If-Modified-Since | Optional | |
| If-None-Match | Optional | |
| If-Range | Optional | |
| If-Unmodified-Since | Optional | |
| Max-Forwards | Optional | |
| Proxy-Authorization | Optional | Not applicable |
| Range | Optional | |
| Referer | Optional | |
| TE | Optional | |
| User-Agent | Optional | |

Specific actions on reception:
The "Host" field shall be omitted, since requested URI is always in absolute form.
The "Authorization" field is described above 5
The smart card server 4 should support the following status codes:

Successful Status-Code =
200 OK
|201 Created
|204 No Content
|205 Reset Content

Client Error Status-Code =
401 Unauthorized
|403 Forbidden
|404 Not Found
|405 Method Not Allowed
|413 Request Entity Too Large
|414 Request-URI Too Large Server Error Status-Code =
500 Internal Server Error
|505 HTTP Version not supported The following table lists the RESPONSE header fields for each of the HTTP request messages that should be supported by the corresponding sending/receiving entities.

| Field | Supported | Additional comments |
|---|---|---|
| Accept-Ranges | Optional | |
| Age | Optional | |
| ETag | Optional | |
| Location | Optional | |
| Proxy-Authenticate | Optional | N/A |
| Retry-After | Optional | |
| Server | Optional | |
| Vary | Optional | |
| WWW-Authenticate | Mandatory | c.f. above |

Specific actions on reception:

None

The smart card web server may support the following ENTITY header fields, for each of the HTTP request messages.

| Field | Supported |
|---|---|
| Allow | Optional |
| Content-Encoding | Optional |
| Content-Language | Optional |
| Content-Length | Mandatory |
| Content-Location | Optional |
| Content-MD5 | Mandatory |
| Content-Range | Optional |
| Content-Type | Mandatory |
| Expires | Optional |
| Last-Modified | Optional |
| Extension-header | Optional |

Specific actions on sending entities:

"Content-Type" HTTP header field should be included by the smart card server depending on the resource being transferred within the HTTP response.

What is claimed is:

1. A method of offering services of an HTTP or HTTPS server, the method comprising:
    mapping a domain name of a first electronic device to an internal IP address associated with a gateway, and wherein the internal IP address is fixed in a static routing and DNS table located on the first electronic device; and
    transmitting HTTP messages over a local physical communication channel between a server and a browser running locally on a second electronic device via the gateway using the mapping;
    wherein the server is implemented by or running locally on the first electronic device that is a portable device, to the browser running on the second electronic device,
    wherein the first electronic device exchanging the HTTP messages with the second electronic device over the local physical communication channel between the first electronic device and the second electronic device according to a Bearer Independent Protocol,
    wherein the second electronic device is a terminal connected over the local physical communication channel to the portable device via the gateway residing on the terminal, and
    wherein on the second electronic device, the local physical communication channel is managed by the gateway which performs protocol conversion of the Bearer Independent Protocol to TCP/IP for messages being received from the HTTP or HTTPS server, and protocol conversion of TCP/IP to the Bearer Independent Protocol for messages being sent to the HTTP or HTTPS server.

2. The method according to claim 1, wherein the HTTP messages communicated by the first electronic device to the second electronic device over the local physical communication channel are determined to be further communicated within the second electronic device over TCP/IP to the browser running on the second electronic device, and wherein the HTTP messages received by the first electronic device from the second electronic device have been communicated within the second electronic device over TCP/IP.

3. The method according to claim 2, wherein the HTTP or HTTPS server serves HTML, xHTML, cHTML or WML pages to the browser.

4. The method according to one claim 1, wherein a DECLARE SERVICE command is used to notify the second electronic device that the first electronic device offers the services of the HTTP or HTTPS server.

5. The method according to claim 1, wherein a user can be authenticated with a standard HTTP WWW-Authenticate delivering attributes selected from a group consisting of PIN-Type and PIN-Value.

6. The method according to claim 1, wherein the first electronic device is a smart card.

7. The method according to claim 1, wherein the first electronic device is a Multi Media Memory card.

8. The method according to claim 1, wherein the second electronic device is a mobile telephone.

9. The method according to claim 1, wherein the second electronic device is a PDA.

10. The method according to claim 1, wherein the second electronic device is a PC.

11. The method according to claim 1, wherein the domain name is used in a Uniform Resource Identifier to indicate that the Uniform Resource Identifier identifies a resource on the first electronic device.

12. The method according to claim 11, wherein the first electronic device is a smart card and wherein the Uniform Resource Identifier comprises information to access standardized smart card applications.

13. The method according to claim 1, wherein a command is sent to the first electronic device in order to open the local physical communication channel when the browser running on the second electronic device opens a TCP/IP socket to the gateway.

14. The method according to claim 13, wherein the TCP/IP socket is mapped to the local communication channel.

15. A system, comprising:
    a first electronic device that is a portable device; and
    a second electronic device,
    wherein the first electronic device provides services of an HTTP or HTTPS server to a browser running on the second electronic device,
    wherein the HTTP or HTTPS server is implemented by or running locally on the first electronic device,
    wherein the first electronic device exchanging HTTP messages with the second electronic device over a local physical communication channel existing between the first electronic device and the second electronic device according to the Bearer Independent Protocol,
    wherein the second electronic device is a terminal connected over the local physical communication channel to the portable device via a gateway residing on the terminal,
    wherein the HTTP messages are transmitted over the local physical communication channel between the server and the browser running locally on the second electronic device via the gateway,
    wherein a domain name of the first electronic device is mapped to an internal IP address associated with the gateway, and wherein the internal IP address is fixed in a static routing and DNS table located on the first electronic device, and
    wherein on the second electronic device, the local physical communication channel is managed by the gateway which performs protocol conversion of Bearer Independent Protocol to TCP/IP for messages being received from the HTTP or HTTPS server, and protocol conversion of TCP/IP to Bearer Independent Protocol for messages being sent to the HTTP or HTTPS server.

* * * * *